3,288,595
NUCLEAR REACTOR FUEL PRODUCTION
Harold F. Reichard, Livingston, N.J., assignor to Union Carbide Corporation, a corporation of New York
No Drawing. Filed June 26, 1963, Ser. No. 290,607
7 Claims. (Cl. 75—84.1)

This application is a continuation-in-part of copending application Serial No. 64,745, filed October 25, 1960, and now abandoned.

This invention relates to a novel process for the production of uranium dioxide nuclear reactor fuels.

Uranium dioxide for nuclear fuels is now prepared from uranosic oxide, $U_3O_8$, by heating the material by induction or resistance means to 1000° C. up to 1900° C. in hydrogen or an inert gas. The product may then be ground and screened and hydraulically pressed and sintered in a furnace at temperatures of 1000° C. to 2000° C. Where the fuel is to be dispersed in metal or ceramic the powdered uranium dioxide is mixed with the metal or ceramic material before sintering and pressing.

It is an object of this invention to provide an improved process for the production of uranium dioxide-containing nuclear fuels. It is another object of this invention to provide a process for the production of jacketed or sheathed fuel slugs for nuclear reactors. Still another object of the present invention is to provide a process for the production of uranium dioxide in sintered shapes. These and other objects will be apparent from the subsequent disclosure and appended claims.

The process which satisfies the objects of the present invention comprises providing a finely-divided mixture of uranosic oxide and at least a stoichiometric amount of at least one metal (designated hereinafter as a metal M) selected from the group consisting of aluminum, magnesium, beryllium, zirconium, calcium, strontium, barium, vanadium, columbium and chromium for the uranium dioxide-forming reaction, compacting the mixture, heating the compact so formed to the initiation temperature of the uranium dioxide-forming reaction, and maintaining the compacts above such temperature until the substantial completion of the initiated reaction. Following this procedure an excellent nuclear reactor fuel product is obtained.

The amount of the metal M employed in the process of this invention should be at least the stoichiometric amount required to convert uranosic oxide to uranium dioxide but less than the amount which causes reduction of the uranium dioxide to uranium metal. Generally, the amount of the metal M is between the stoichiometric amount and the stoichiometric amount plus 10 weight percent. A portion of the excess amount of the metal M over the stoichiometric amount reacts with any air which may be in contact with the mixture of the medal M and the uranosic oxide.

All of the metals M listed above react efficiently with uranosic oxide to form uranium dioxide and an oxide of the metal M. These reactions are all characterized by a negative net change in the free energy of the reaction as shown by the data in Table I. The data in Table I were taken from the Argonne National Laboratory Report No. ANL-5107, and the free energy changes were calculated for the reactions shown by conventional procedures.

Table 1

| Reaction | Net Free Energy Change in Kilocalories per Mole of $UO_2$ Formed | |
|---|---|---|
| | 227° C. | 727° C. |
| $4\ Al + 3\ U_3O_8 \rightarrow 2\ Al_2O_3 + 9\ UO_2$ | −41 | −34 |
| $2\ Mg + U_3O_8 \rightarrow 2\ MgO + 3\ UO_2$ | −47 | −38 |
| $2\ Ca + U_3O_8 \rightarrow 2\ CaO + 3\ UO_2$ | −53 | −46 |
| $2\ Sr + U_3O_8 \rightarrow 2\ SrO + 3\ UO_2$ | −46 | −36 |
| $2\ Ba + U_3O_8 \rightarrow 2\ BaO + 3\ UO_2$ | −40 | −33 |
| $4\ Cr + 3\ U_3O_8 \rightarrow 2\ Cr_2O_3 + 9\ UO_2$ | −12 | −5 |
| $4\ V + 3\ U_3O_8 \rightarrow 2\ V_2O_3 + 9\ UO_2$ | −5 | −2 |
| $4\ Cb + 5\ U_3O_8 \rightarrow 3\ Cb_2O_5 + 15\ UO_2$ | −11 | −7 |
| $2\ Be + U_3O_8 \rightarrow 2\ BeO + 3\ UO_2$ | −50 | −41 |
| $Zr + U_3O_8 \rightarrow ZrO_2 + 3\ UO_2$ | −39 | −31 |

The minimum temperature at which the reaction of the metal M with the uranosic oxide is initiated depends on a number of factors, such as the particular metal M, the degree of subdivision of the reactants, the intimacy of mixing and the degree of compaction. Where the reactants are finely divided, well mixed and highly compacted, the reaction can be initiated at temperatures as low as 600° C. Where the reactants are less finely divided, less well mixed and lightly compacted, initiation temperatures are generally in the range of from 650° C. to 750° C. The reaction is easily initiated under practically all conditions at temperatures in the range of 800° C. to 900° C.

Once the reaction of the metal M with the uranosic oxide has been initiated, it is exothermic and self-sustaining until the reaction is complete. The reaction is in fact highly exothermic and the temperature in the reaction mixture can exceed 2000° C. during the course of the reaction.

As the reaction progresses, both uranosic oxide and uranium dioxide are present in the reaction mixture. However, the metal M continues to react selectively with the uranosic oxide rather than with the uranium dioxide, which latter reaction would result in the production of uranium metal. Even at the very high temperatures produced by the exothermic reaction, the metal M reacts selectively and substantially completely with the uranosic oxide. Analysis of the reaction products shows that from greater than 99 percent up to 100 percent of the uranium in the product is present as uranium dioxide at the completion of the reaction.

To illustrate this process, uranosic oxide was ground to pass through a 200 mesh screen and mixed with 100 mesh reagent grade aluminum powder. A ten percent excess of the stoichiometric amount of aluminum required to produce $UO_2$ was used. The material was pressed in a cylindrical die at 7 tons per square inch pressure. The pressure was such as to form a pellet ⅜ inch thick by 1¼ inch in diameter from 30 grams of the reaction mixture. The excess aluminum was utilized to react with any air which may have remained in the voids in the pellet. The pellet was surrounded with 40 mesh coke, covered with magnesium oxide to prevent air oxidation of the coke and put into a nickel crucible. The crucible was heated at 800° C. for 20 minutes. The crucible was then removed and allowed to cool to room temperature. The product pellet, while to some extent exhibiting fragility, was a suitable material for nuclear reactor fuels. The process was repeated utilizing 200 mesh aluminum powder. This time the product was not only suitable for use as fuel but was hard and strong.

In another example, a mixture comprising 1 gram of 70 to 80 mesh magnesium metal and 14 grams of uranosic oxide ground to pass through a 200 mesh screen was pressed at 9 tons per square inch to form a pellet ⅜ inch thick and 1⅛ inch in diameter. The pellet was packed in granular coke in a covered nickel crucible and the assembly put into a preheated furnace at 900° C. for 20 minutes. The crucible was then air cooled and unpacked. A strong, sintered, brown pellet of uranium dioxide-magnesium oxide was produced.

As may be seen from the foregoing, the use of finely divided reactants of the order of 200 mesh and smaller provides a product that is considerably stronger and harder than when reactants that is considerably stronger and harder than when reactants of larger particle size are used. It has additionally been found that the inclusion of calcium fluoride, $CaF_2$, in fluxing amounts aids greatly in providing a product having high strength and hardness. The melting point of calcium fluoride is such that good fluxing is obtained at the temperatures involved in the reaction. In addition, calcium fluoride is isomorphous with uranium dioxide. A convenient amount of calcium fluoride is about 5 to 10 percent by weight of the total reaction mixture.

To illustrate the use of calcium fluoride, pellets were again made with a 200 mesh uranosic oxide and 10 percent stoichiometric excess of 100 mesh grade aluminum powder but with 10 percent C.P. calcium fluoride powder added. After pressing and packing the mixture and firing at 700° C. for 20 minutes a product was produced having a substantially greater strength than pellets made without the additive. The test was repeated using 200 mesh aluminum powder and 5 percent calcium fluoride powder. Again a strong hard pellet was obtained.

One of the particular advantages of the process of the present invention is that it permits production of sheathed fuel elements. In this instance the reaction mixture is packed into the sheathing material and the reaction is initiated in situ. A superior, dense, sheathed fuel element is obtained by this method.

To illustrate the process for the production of a sheathed fuel element, 267 grams of uranosic oxide ground to pass through a 200 mesh screen were thoroughly mixed with 18 grams of 70 to 80 mesh magnesium. The mixture was hand tamped into an unlined 1-inch standard stainless steel pipe, 7 inches long. Screw caps were tightened onto the threaded ends of the pipe. The loaded pipe was placed in a furnace and heated at 900° C. for one hour. It was then air cooled and opened. A suitable sheathed fuel element had been produced; however, the product fell out as loose lumps when the open tube was rapped sharply. Analysis showed the uranium to be 99.1 percent in the uranium dioxide form.

A second sheathed element was prepared by mixing 20 grams of 100 to 200 mesh aluminum powder and 440 grams uranosic oxide ground to pass through a 200 mesh screen. Portions weighing about 50 grams each were pressed at 900 pounds per square inch to form 9 pellets, each 1⅛ inch in diameter by 0.06 inch in length. These pellets were hydraulically rammed into a tight fitting precision bored stainless steel tube fitted with threaded sockets and ground faced screwed end plugs. An additional pellet weighing about 10 grams was added so that when both end plugs were screwed into seat in their sockets, the charge was lightly compressed. The loaded tube was essentially free of air or voids and was put through a furnace at room temperature. The furnace was slowly heated, reaching 940° C. in 3½ hours. The assembly was then cooled overnight and opened. The product was a solid dense, sintered slug. With both ends of the tube open a hydraulic ram was unable to push the product out with a 17,000 pound force. The metal tube was cut and the product was found to be a sintered brown $UO_2$–$Al_2O_3$ core slug which was removed in sections. Conversion of uranium to the uranium dioxide form was found to be 100 percent complete.

Samples of the product produced in accordance with the foregoing examples were subjected to X-ray diffraction studies. It was found that in all cases the desired uranium dioxide face centered cubic crystal structure predominated with essentially no other forms of uranium. Microscopic examination of the samples showed that fusion had occurred indicating that the temperature had exceeded 2000° C. during the course of the reaction.

While the foregoing examples were with magnesium and/or aluminum, the process is equally applicable with beryllium, zirconium, columbium, strontium, barium, vanadium, and chromium. However, a highly satisfactory, low cost product is obtained with aluminum and magnesium. Additionally, it should be noted that particularly valuable products may be obtained utilizing reductant metals having suitable neutron capture cross-sections and which form refractory oxides such as those of magnesium, zirconium and beryllium.

The process which most satisfies the objects of the present invention utilizes calcium fluoride in the reaction mixture with the entire reaction mixture having a particle size of 200 mesh or finer. The amount of reductant should be of the order of about 10 percent excess aluminum with the reaction mixture first being compacted following which the compacts are rammed into the sheathing material under high pressure.

What is claimed is:

1. A process for the production of metal oxide nuclear fuels comprising providing a finely-divided mixture of uranosic oxide and an amount of at least one metal selected from the group consisting of aluminum, magnesium, beryllium, zirconium, calcium, strontium, barium, vanadium, columbium and chromium, said amount of said selected metal being between the stoichiometric amount required to convert said uranosic oxied to uranium dioxide and a 10% excess of said stoichiometric amount; compacting said mixture; heating the compact so formed to the initiation temperature of the uranium dioxide-forming reaction being at least 600° C., and maintaining said compact above said temperature until the substantial completion of the uranium dioxide-forming reaction and until there is substantially complete oxidation of said selected metal.

2. A process for the production of metal oxide nuclear fuels comprising providing a finely-divided mixture of uranosic oxide, an amount of at least one metal selected from the group consisting of aluminum, magnesium, beryllium, zirconium, calcium, strontium, barium, vanadium, columbium and chromium, said amount of said selected metal being between the stoichiometric amount required to convert said uranosic oxide to uranium dioxide and a 10 percent excess of said stoichiometric amount, and fluxing proportions of calcium fluoride; compacting said mixture; heating the compact so formed to the initiation temperature of the uranium dioxide-forming reaction being at least 600° C.; and maintaining said compact above said temperature until the substantial completion of the uranium dioxide-forming reaction and until there is substantially complete oxidation of said selected metal.

3. A process for the production of metal oxide nuclear fuels comprising providing a finely-divided mixture of uranosic oxide an an amount of at least one metal selected from the group consisting of aluminum, magnesium, beryllium, zirocnium, calcium, strontium, barium, vanadium, columbium and chromium, said amount of said selected metal being between the stoichiometric amount required to convert said uranosic oxide to uranium dioxide and a 10% excess of said stoichiometric amount; compacting said mixture; packing the compact so formed in a metal sheath; heating the packed sheath to the initiation temperature of the uranium dioxide-forming reaction being at least 600° C.; and maintaining said compact above said temperature until the substantial completion of the uranium dioxide-forming reaction and until there is substantially complete oxidation of said selected metal.

4. A process for the production of metal oxide nuclear fuels comprising providing a finely-divided mixture of uranosic oxide, an amount of at least one metal selected from the group consisting of aluminum, magnesium, beryllium, zirconium, calcium, strontium, barium, vanadium, columbium and chromium, said amount of said selected metal being between the stoichiometric amount required to convert said uranosic oxide to uranium dioxide and a 10 percent excess of said stoichiometric amount, the fluxing proportions of calcium fluoride; compacting said mixture; packing the compact so formed in a metal sheath; heating the packed sheath to the initiation temperature of the uranium dioxide-forming reaction being at least 600° C.; and maintaining said compact above said temperature until the substantial completion of the uranium dioxide-forming reaction and until there is substantially complete oxidation of said selected metal.

5. A process for the production of metal oxide nuclear fuels comprising providing a finely-divided mixture of uranosic oxide and aluminum, the amount of aluminum being about 10 percent more than the stoichiometric amount required to convert said uranosic oxide to uranium dioxide; compacting said mixture; packing the compact so formed in a metal sheath; heating the packed sheath to a temperature of about 940° C. until substantial completion of the uranium dioxide forming reaction and substanially complete oxidation of said aluminum.

6. A process for the production of metal oxide nuclear fuels comprising providing a finely-divided mixture of uranosic oxide and magnesium, the amount of magnesium being about 10 percent more than the stoichiometric amount required to convert said uranosic oxide to uranium dioxide; compacting said mixture; packing the compact so formed in a metal sheath; heating the packed sheath to a temperature of about 900° C. until substantial completion of the uranium dioxide forming reaction and substantially complete oxidation of said magnesium.

7. A process for the production of metal oxide nuclear fuels comprising providing a finely-divided mixture of uranosic oxide, aluminum and calcium fluoride, the amount of aluminum being about 10 percent more than the stoichiometric amount required to convert said uranosic oxide to uranium dioxide and the amount of calcium fluoride being about 5 to 10 percent by weight of the total reaction mixture; compacting said mixture; and heating the compact to a temperature of about 700° C. until substantial completion of the uranium dioxide forming reaction and substantially complete oxidation of said aluminum.

References Cited by the Examiner
UNITED STATES PATENTS

| | | | |
|---|---|---|---|
| 2,816,042 | 12/1957 | Hamilton | 23—14.5 |
| 3,025,156 | 3/1962 | Humbert et al. | 75—84.1 |
| 3,099,555 | 7/1963 | Teitel | 75—85.1 |

OTHER REFERENCES

AEC Document KAPL–1380 (Del.), Preparation of Spherical Uranium Powder for Reduction of Uranium Trioxide With Calcium, July 22, 1955, pp. 1 and 2.

The Chemistry of Uranium (Part I), J. P. Katz and E. Rabinowitch, pages 122–124, 1951.

Progress in Nuclear Energy, vol III, Process Chemistry, pages 25–26, 1956.

BENJAMIN R. PADGETT, *Primary Examiner.*

REUBEN EPSTEIN, LEON D. ROSDOL, *Examiners.*

R. L. GOLDBERG, M. J. SCOLNICK,
*Assistant Examiners.*